United States Patent Office 3,707,525
Patented Dec. 26, 1972

3,707,525
FLAME RETARDANT EPOXY RESINS
Lucien Sobel, Paris, Ludovic Parvi, Pont-de-Claix, and Arsene Isard, Grenoble, France, assignors to Ugine Kuhlmann, Paris, France
No Drawing. Continuation-in-part of application Ser. No. 820,310, Apr. 29, 1969. This application July 14, 1970, Ser. No. 54,869
Int. Cl. C08g 30/14
U.S. Cl. 260—47 EA                 9 Claims

ABSTRACT OF THE DISCLOSURE

Flame retardant epoxy resins comprising a polyhalogenated aromatic amine having the general formula:

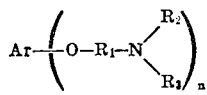

in which $n=1$ to 4, Ar is a polyhalogenated aromatic radical, $R_1$ is an aliphatic or cycloaliphatic radical and $R_2$ and $R_3$ are hydrogen or an aliphatic, or a glycidyl radical or cycloaliphatic or heterocyclic alkyl radical. The amines are prepared by reacting a polyhalogenated aromatic compound with either an alcoholate of an amino alcohol or with the amino alcohol in the presence of an alkaline agent. Glycidyl radicals are attached by reaction with epichlorohydrin or the like.

RELATED APPLICATION

This application is a division and continuation-in-part of our copending application Ser. No. 820,310, filed Apr. 29, 1969 for "Polyhalogenated Aromatic Amines and Epoxy Resins Derived Therefrom" which application claimed priority under 35 U.S.C. 119 to French patent application No. 150,251, filed May 2, 1968.

BACKGROUND

This invention relates to novel fire retardant epoxy resins including novel amines.

In the past attempts have been made to introduce halogens into epoxy resins in order to improve their flame resistance. For example, attempts have been made to use chlorinated or brominated derivatives of bis (hydroxyphenyl)-propane in the preparation of glycidyl ethers. Also, halogenated compounds, such as chlorendic acid, have been used as hardeners and compounds such as pentachlorophenol and its glycidyl ether have been introduced as reactive diluents in the preparation of epoxy resins for the same purpose. However, the products obtained do not give adequate self-extinguishing properties as measured by the A.S.T.M.D. 635–56T test because the halogen content is too low.

Recently, proposals have been made to use hardeners with a polyamine base obtained by condensing strongly halogenated aromatic derivatives with polyamines. Even if products obtained in this manner provide effective resistance to flaming, they are unsatisfactory because they are strongly colored and the presence in the molecule of a nuclear NH group greatly reduces their resistance to aging.

Our invention overcomes these problems. The resins which are the subject of this invention have remarkable flame resistant properties as a result of the inclusion therein of a polyhalogenated aromatic amine. Bonding of the amino group with the polyhalogenated aromatic nucleus is assured by an ether oxide bridge.

DESCRIPTION

Briefly stated, the polyhalogenated aromatic amines which comprise our invention have the following general formula:

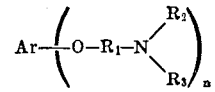

in which $n$ is equal to 1, 2, 3, or 4
Ar represents a polyhalogenated aromatic radical,
$R_1$ represents an aliphatic or cycloaliphatic radical,
$R_2$ and $R_3$ each represent a hydrogen atom or an aliphatic, or a glycidyl radical, or cycloaliphatic or heterocyclic alkyl radical or together may form a cycle or heterocycle.

Preferably, the aromatic radicals contain from 1 to about 5 aromatic nuclei. Examples of suitable polyhalogenated aromatic radicals are polyhalophenyl (pentachlorophenyl), polyhalobiphenyl (octachlorobiphenyl), polyhaloterphenyl, polyhaloquaterphenyl, etc. The aliphatic or cycloaliphatic radicals represented by $R_1$ may have one or more functions or substituents such as amine, ether, halogen or an ethylenic double bond. However, we prefer a short chain alkyl (alkylidene) radical. Similarly, the radicals represented by $R_2$ and $R_3$ may have one or more functions or substituents such as amine, ether, halogen or an ethylenic double bond. We prefer, however, that $R_2$ and $R_3$ be hydrogen or an alkyl or glycidyl radical.

The method of preparing the novel amines which are disclosed and claimed in our copending application referred to above comprises reacting a polyhalogenated aromatic compound with either an alcoholate of an amino alcohol or with the amino alcohol itself in the presence of an alkaline agent. The reaction can be carried out either in the presence or the absence of one or more inert solvents. Generally, an almost stoichiometric amount of amino alcohol is used, although it would be possible, without disadvantage, to use a slightly different proportion. It is also preferable to introduce the alkaline agent in a stoichiometric amount or slightly higher. Glycidyl radicals may be added by a further reaction with epichlorohydrin or the like.

Exemplary of amino alcohols that can be used are monoethanolamine, diethanolamine, triethanolamine, N-alkylethanolamines, and propanolamine. Among the polyhalogenated aromatic compounds which can be used are hexachlorobenzene, hexabromobenzene, hexafluorobenzene, trichlorotribromobenzene, polychlorobiphenyls, polychloroterphenyls, polychloroquaterphenyls, polybromobiphenyls, polybromoterphenyls, and polybromoquaterphenyls.

The process is notable for its selectivity although a concurrent reaction of substitution of halogen atoms by the amino group could be expected.

The epoxy resins which constitute a part of our invention can be prepared as follows. Flame retardant epoxy resins can be prepared by direct reaction of an polyhalogenated aromatic amine as described with a polyepoxide. In this case, preferably at least 2 of the $R_2$ or $R_3$ groups of the amine are hydrogen atoms. Suitable polyepoxides are polyglycidyl ethers derived, for example, from bis (hydroxyphenyl)propane such as those commercialized by the Shell Company under the name of Epikotes or by the Ciba Company under the name of Araldites, cyclic epoxides such as epoxy-3,4-methyl-6-cyclohexane-carboxylate of epoxy-3,4-methyl-6-cyclohexyl-methyl and diepoxide of dicyclopentadiene.

Flame retardant epoxy resins can also be prepared by reaction of a common hardener with a polyhalogenated aromatic amine in which at least 2 of the $R_2$ or $R_3$ groups of the amine are glycidyl radicals, for example, having the following formulas:

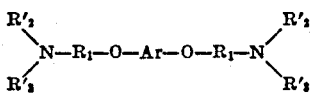

in which $R'_2$ and $R'_3$ are hydrogen atoms, aliphatic, cycloaliphatic or heterocyclic radicals, but two at least by molecule represent the glycidyl groups

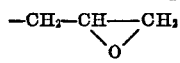

and Ar represents a polyhalogenated aromatic radical and

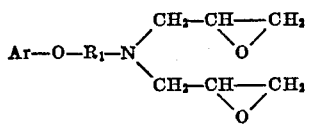

in which Ar represents a polyhalogenated aromatic radical, Suitable hardeners are anhydrides of di-carboxylic acids such as maleic anhydride or polyamines like methylenedianiline.

The following nonlimiting examples will illustrate the various aspects of the invention.

EXAMPLE I 499 g. of decachlorobiphenyl, 122 g. of monoethanolamine, 112 g. of flaked NaOH and 1200 cm.$^3$ of dioxane were introduced into a reactor provided with an agitation system, a reflux condenser, and heated by a thermostated bath. It was heated for 6 hours at the boiling point, and after cooling, was filtered; then the filtrate was diluted with 250 cm.$^3$ of an aqueous solution of 10% NaCl and the excess of NaOH neutralized. As the result of the dilution, a paste was separated which was washed several times with water, and then dried in an oven at 50°.

The dry product contained 4.8% nitrogen and 51.1% chlorine. Theory for bis (amino-2-ethoxy)-octachlorobiphenyl: 51.9% chlorine, 5.1% nitrogen.

7 parts of bis (amino-2-ethoxy)-octachlorobiphenyl prepared as described above were mixed at 80° C. with 3 parts of diethylenetriamine. To this mixture were added 90 parts of resin Araldite 101 (polyepoxide commercialized by the Ciba Company), by ensuring a good homogeneity. The whole is poured into an aluminum mold and maintained in a drying oven for 2 hours at 120-130° C., then for 2 hours at 180-190° C. The cured resin plate recovered was found to have a flame resistance better than that obtained by using a hardener diethylenetriamine only.

EXAMPLE II 30 parts of the mixture of bis (amino-2-ethoxy)-octachlorobiphenyl and diethylenetriamine utilized in Example I were added to 70 parts of resin Epikote 827 (polyepoxide commercialized by the Shell Company) by ensuring a good homogeneity. The whole is poured into an aluminum mold and maintained in a drying oven for 5 hours at 130° C. The cured resin plate recovered had a clear yellow color, was translucid and self-extinguishable according to test ASTM D 635.

EXAMPLE III 58.6 g. of the bis (amino-2-ethoxy)-octachlorobiphenyl as described above as well as 138.5 g. of epichlorohydrin were introduced into a reactor and heated at 110° C. to the point of dissolution. Then progressively in 20 minutes 31.2 of a 50% aqueous solution of NaOH were added and maintained at the boiling point until the end of the water distillation. The excess of epichlorohydrin was eliminated by evaporation under vacuum and the residue recovered by 200 cm.$^3$ of monochlorobenzene. By filtration the NaCl that was formed was separated and the filtrate was concentrate to obtain 85 g. of a yellow resin titrating 0.3 epoxy group nd 40 g. of chlorine per 100 g.

At 80° C. 60 g. of this resin, 20 g. of Araldite 101 (polyepoxide commercialized by the Ciba Company) and 20 g. of maleic anhydride as a hardener were mixed, then the mixture was poured into a mold and heated at 150 C. for 15 minutes. Thus, a clear yellow, translucid, very hard and self-extinguishable (according to the A.S.T.M. D 635–56T test) plate was obtained.

EXAMPLE IV 100 parts of polyepoxide resin prepared from bis (amino-2-ethoxy)-octachlorobiphenyl, as mentioned in Example III were mixed at 80° C. with 12.5 parts of metaphenylenediamine as a hardener. The whole is poured into an aluminum mold and is maintained in a drying oven for 2 h. at 100° C. Thus, a brown, translucid, very hard and self-extinguishable plate was obtained whose main properties figure in Table I.

The hardened resin is completely self-extinguishing and has a very high softening point, an excelent hardness and a correct impact resistance.

EXAMPLE V 80 parts of polyepoxide resin prepared from bis (amino-2-ethoxy)-octachlorobiphenyl, as mentioned in Example IV were mixed at 80° C. with 20 parts of resin Epikote 812 (product commercialized by the Shell Company) and 12.5 parts of metaphenylenediamine as a hardener. The whole is poured into an aluminum mold and is maintained in a drying oven at 100° C. for 2 hours. Thus a brown, translucid, very hard and self-extinguishable plate is obtained whose main properties figure in Table I. The hardened resin is completely self-extinguishable and has a high softening point, an excellent hardness and a correct impact resistance.

EXAMPLE VI

By way of comparison, 100 parts of polyepoxide resin Araldite 103 (product commercialized by the Ciba Company) are mixed at 80° C. with 12.5 parts of metaphenylenediamine as a hardener. The whole is poured into an aluminum mold and is maintained in a drying oven at 100° C. for 2 hours. Table I shows the obtained hardened resin is not self-extinguishable and has a softening temperature much lower than that of the hardened resins obtained in Examples IV and V.

TABLE I.—MAIN PROPERTIES OF EPOXY RESINS OBTAINED IN EXAMPLES IV, V, AND VI

|  | Density, g./cm.$^3$ | Izod impact resistance kg. cm./ cm. of notch | Rockwell hardness, scale R | 1/10e Vicat point | Inflammability, mm./mn. |
|---|---|---|---|---|---|
| Standard ASTM | | D 256 | D 785 | D 1525 | D 635 |
| Example: | | | | | |
| 4 | 1.47 | 1.9 | 121 | 130 | (¹) |
| 5 | 1.45 | 2.2 | 122 | 120.5 | (¹) |
| 6 | 1.20 | 2.3 | 111 | 82 | 6.8 |

¹ Self-extinguishing.

EXAMPLE VII 96.4 g. of decarbomodiphenyl, 12.2 g. of monoethanolamine, 500 cm.$^3$ of dioxane and 11.2 g. of flaked NaOH were introduced into a reactor and heated for 5 hours at 100° under nitrogen. Proceeding as in Example I, a product was obtained that contained 68.6% of bromine and 2.97% of nitrogen. Theory for bis (amino-2-ethoxy)-octabromobiphenyl is 70.8% bromium, 3.1% nitrogen.

40 g. of this product were dissolved in 74 g. of epichlorohydrin and gradually 14.4 g. of a 50% aqueous solution of NaOH were added. Then, following the method of procedure of the above example, an epoxy resin was obtained that contained 0.18 epoxy group per 100 g. and 44% of bromine.

EXAMPLE VIII 142.5 g. of hexachlorobenzene, 30.5 g. of monoethanolamine, 28 g. of NaOH and 500 cm.$^3$ of dioxane were introduced into a reactor. Proceeding as in Example I, 150 g. of a powder were obtained that contained 58% of chlorine and 4.38% nitrogen. Theory for pentachlorophenoxy-ethylamine is 57.4% of chlorine, 4.5% of nitrogen.

100 g. of this product were treated under the conditions of Example III by 185 g. of epichlorohydrin and 44 g. of a 50% aqueous solution of NaOH. 127 g. of a resin were obtained that contained 0.22 epoxide group per 100 g. and 47% of chlorine.

EXAMPLE IX 125 g. of decachlorobiphenyl, 44.5 g. of N-N-dimethyl-ethanolamine, 28 g. of NaOH and 310 cm.³ of dioxane were introduced into a reactor. They were heated at the boiling point for 3 hours and thirty minutes and the reactive mixture was treated under the conditions of Example I. A product was obtained that titrated 48.6% of chlorine and 4.1% of nitrogen.

This tertiary amine may be added, for example, as a catalyst in the range of 5 to 15 parts per hundred polyepoxide resin, by weight. It may also be added, for example, as an accelerator for anhydride amines in the amount of 0.1 to 3 parts per hundred resin.

EXAMPLE X 142.5 g. of hexachlorobenzene, 44.5 g. of N-N-dimethyl-ethanolamine, 28 g. of NaOH and 500 cm.³ of dioxane were introduced into a reactor. They were heated at the boiling point for 3½ hours and the reactive mixture was treated under the conditions of Example I. A product was obtained that titrated 53.3% of chlorine and 4.15% of nitrogen.

This tertiary amine may be used in polyepoxide resins, for example, as described in Example IX.

While applicants' invention is not entirely understood, it is believed resins according to this invention have an unusual combination of good physical properties and flame resistance after curing because in the polyhalogenated aromatic amine the polyhalogenated aromatic nucleus is bonded to the amino group through an ether oxide bridge.

Throughout the specification and claims the terms polyepoxide is directed to polymerizable, polyepoxide and polyglycidyl compounds such as the commercial polyepoxide resins mentioned and, for example, diglycidyl ether of bisphenol A (and its homologs), glycidyl ethers of glycerol, glycidyl ethers of bisphenol F, glycidyl ethers of tetrakis (hydroxyphenyl) ethane and epoxylated novolacs. The term hardeners is used in its well established sense, for example, tertiary amines as catalytic hardeners. Hardeners also include compounds that cause crosslinking, such as alcohols, polyfunctional primary and secondary amines, organic acids and anhydrides of organic acids.

Having thus described my invention in detail and with the particularity required by the patent laws, what is desired protected in Letters Patent is set forth in the following claims.

What is claimed is:

1. A flame retardant epoxy resin consisting of 1,2 polyepoxides, conventional epoxy hardener and a polyhalogenated aromatic amine having the formula:

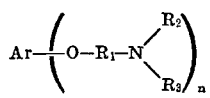

in which
$n$ is 1 to 4
Ar is a polyhalogenated aromatic radical
$R_1$ is selected from the group consisting of aliphatic and cycloaliphatic radicals and
$R_2$ and $R_3$ are selected from the group consisting of hydrogen, aliphatic radicals and cycloaliphatic radicals.

2. A flame retardant epoxy resin prepared by reacting a conventional epoxy hardener with a polyepoxide having the formula:

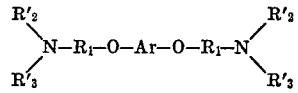

in which Ar is a polyhalogenated aromatic radical, $R_1$ is selected from the group consisting of aliphatic and cycloaliphatic radicals and $R'_2$ and $R'_3$ are selected from the group consisting of hydrogen, aliphatic radicals, and cycloaliphatic radicals and at least two of $R'_2$ and $R'_3$ are glycidyl groups.

3. The epoxy resins set forth in claim 2 in which the hardener is an anhydride of a di-carboxylic acid.

4. A flame retardant resin prepared by reacting a conventional epoxy hardener with a polyepoxide having the formula:

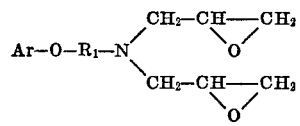

in which Ar is a polyhalogenated aromatic radical and $R_1$ is selected from the group consisting of aliphatic and cycloaliphatic radicals.

5. The epoxy resins set forth in claim 4 in which the hardener is an anhydride of a di-carboxylic acid.

6. A flame retardant epoxy resin comprising a 1,2-polyepoxide and a polyhalogenated aromatic amine having the formula:

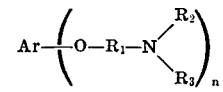

in which
$n$ is 1 to 4
Ar is a polyhalogenated radical
$R_1$ is an alkylidene radical and
$R_2$ and $R_3$ are selected from the group consisting of hydrogen and lower alkyl radicals in which at least two groups are hydrogen.

7. The resin according to claim 6 wherein the amine is bis(amino-2-ethoxy)-octachlorobiphenyl.

8. A flame retardant epoxy resin comprising a conventional epoxy hardener and a polyhalogenated aromatic amine polyepoxide having the formula:
in which

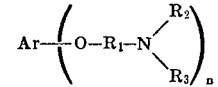

$n$ is 1 to 4
Ar is a polyhalogenated aromatic radical
$R_1$ is an alkylidene radical and
$R_2$ and $R_3$ are selected from the group consisting of hydrogen, lower alkyl radicals and glycidyl radicals in which at least two groups are glycidyl radicals.

9. A flame retardant epoxy resin comprising a 1,2 polyepoxide and a polyhalogenated aromatic amine having the formula:

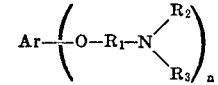

in which
$n$ is 1 to 4
Ar is a polyhalogenated aromatic radical $R_1$ is an alkylidene radical and
$R_2$ and $R_3$ are lower alkyl radicals.

References Cited

UNITED STATES PATENTS

| | | | |
|---|---|---|---|
| 2,989,502 | 6/1961 | Prescott et al. | 260—47 |
| 3,213,140 | 10/1965 | Mills | 260—570.7 |
| 3,359,216 | 12/1967 | Szobel et al. | 260—47 |
| 3,472,896 | 10/1969 | Seki et al. | 260—570.7 |
| 3,513,153 | 5/1970 | Horstmann et al. | 260—152 |
| 3,360,486 | 12/1967 | Garnish | 260—2 |

FOREIGN PATENTS 1,020,031   11/1957   Germany  _____ 260—570.7

WILLIAM H. SHORT, Primary Examiner

T. E. PERTILLA, Assistant Examiner

U.S. Cl. X.R.

260—2 N, 2 EC, 47 EC, 47 EN, 59, 78.4 EP, 348 C, 570.7, DIG. 24